Patented Dec. 24, 1940

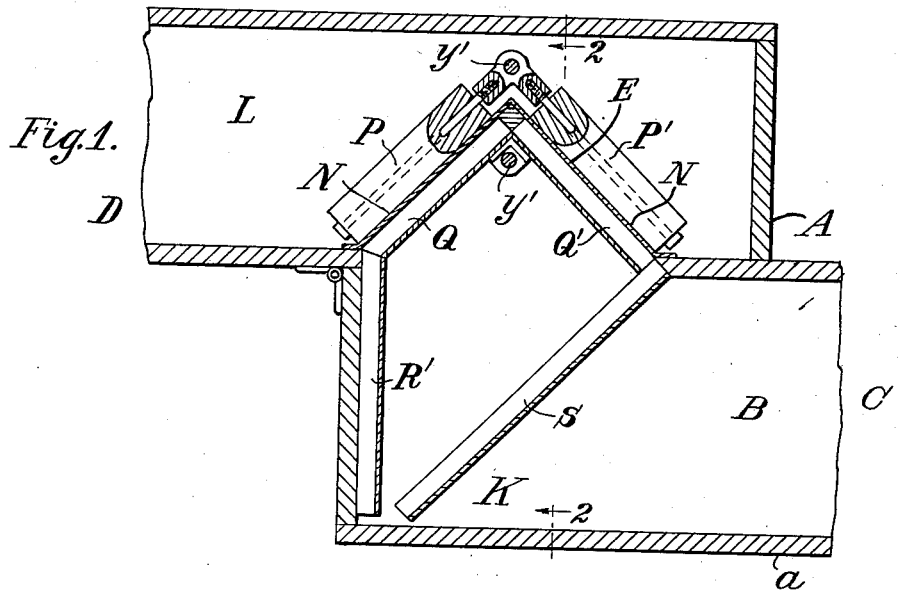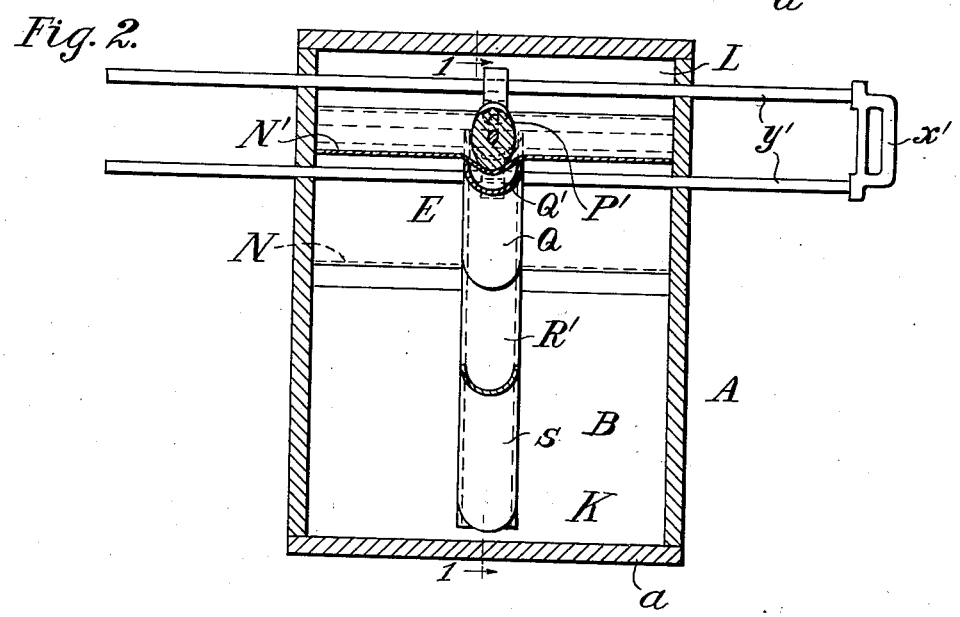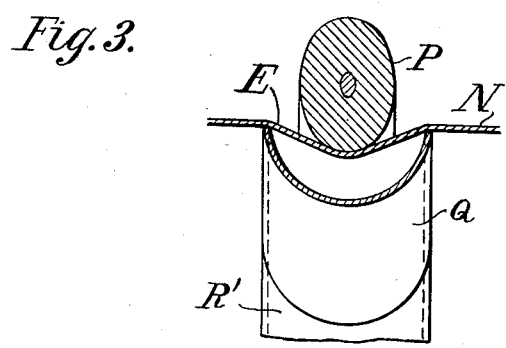

2,225,628

UNITED STATES PATENT OFFICE 2,225,628

AIR AND OTHER FILTERS AND CONDITIONERS

George Holt Fraser, Brooklyn, N. Y.

Application June 30, 1937, Serial No. 151,222

1 Claim. (Cl. 183—53)

This application contains subject matter formerly included in my earlier application Serial No. 659,813 filed March 6, 1933, now Patent No. 2,094,531, granted Sept. 28, 1937, other subject matter of which has been protected by claims in the above mentioned patent.

This invention relates to filters for air and other fluids, and aims to improve said devices.

To this end the invention provides various features of improvement the preferred embodiment of which will be hereinafter more fully set forth with reference to the accompanying drawing, in which Fig. 1 is a fragmentary vertical longitudinal section of a cold air box, radiator or window ventilator provided with the preferred form of my present improvements, cut approximately on the line 1—1 in Fig. 2 and looking in the direction of the arrow thereon;

Fig. 2 is a fragmentary vertical cross section thereof cut approximately on the line 2—2 in Fig. 1 and looking in the direction of the arrow thereon; and Fig. 3 is an enlarged fragmentary longitudinal section of one of the filter walls and its deflector and distorter.

Referring to the drawing let A indicate an outer casing, B a fluid flow passage therein, C an inlet thereto, D an outlet therefrom, and E a filter medium within the casing A and extended across the passage B between the inlet C and the outlet D.

These parts may be of any usual or suitable construction for passing a particle laden current through an interstitial filter wall, for intercepting particles floating in the current.

The casing shown consists of walls $a$ enclosing the flow passage B which is in communication from the inlet C to the outlet D.

The filter medium shown comprises an interstitial or foraminous wall within the casing A and across the flow passage B therein and intersects communication between the inlet C and the outlet D, for intercepting particles floating from the inlet toward the outlet, and for dropping intercepted particles into a dust chamber K in communication with the inlet C, and for passing clean fluid into an egress chamber L in communication with the outlet D, and separates the dust chamber K from the egress chamber L, as is usual in such devices.

Cleaning means comprising distortion means P are shown at the outlet side of the filter medium E, and cleaning means comprising deflector means Q are shown at the inlet side of the latter, those shown being similar to those shown and claimed in my co-pending application Serial No. 659,813, now Patent No. 2,094,531.

My present application pertains to that part of my original invention originally set forth in my said earlier application which included a pair of reversely inclined filter walls, each having an under inlet side and an upper egress side, and a pair of oppositely inclined cleaning means below and above said walls respectively and co-operable therewith to deflect current flow at the under sides thereof and to distort the upper sides thereof, said parts being of greater inclination than that equaling the angle of flow of intercepted particles, for facilitating precipitation of the latter from the under sides of said walls, and gravity flow of such precipitates through said quiescent zone to below or without the zone of said current, and aims to protect said part of my said original invention.

To this end in the preferred utilization of that part of my invention to which this application pertains I make the filter medium E as a pair of oppositely inclined interstitial filtering walls, portions or halves, as N and N', and I make the cleaning means of similarly oppositely inclined portions or halves, as a pair of oppositely inclined deflector means, as Q and Q', below and in proximity with the under sides of said inclined walls respectively, and of similar inclination to and extending substantially parallel with the latter throughout the slant height thereof respectively, and constructed and arranged to intercept the upflow of fluid toward the under sides of said walls, to afford a quiescent zone between said deflectors and portions of the under sides of said walls in which said separation and precipitation from said under sides of particles deposited thereon is facilitated, and of similarly inclined distortion means having oppositely inclined portions or halves, as a pair of oppositely inclined distorters P and P', resting on said portions of the filtering walls, respectively, opposite and distorting said walls toward said deflecting means respectively, for facilitating said separation and precipitation, said walls and said cleaning means being one movable relatively to the other and having means for moving the movable one of said parts, whereby dislodgment of said particles is successively facilitated from each portion of the under sides of said walls through the relatively quiescent zone defined by said deflectors.

Any suitable means may be employed for accomplishing this, but I prefer to make the filter medium E as a rectilinear horizontally stationary wall extended transversely across the flow passage B from one side wall to the other side wall of the casing A, and of inverted V-shape in cross-section, as a pair of oppositely inclined portions N and N', and to make the cleaning means horizontally movable longitudinally of this wall and of similar inverted V-shape, and comprising a pair of oppositely inclined deflector means or portions, as Q and Q', under and adjacent and extended throughout the slant height of the portions N and N' respectively, and comprising a pair of oppositely inclined distorting means or portions, as P and P', above and resting on the portions N and N' and opposite said deflecting means respectively, and by mounting the deflecting means and the distortion means on and to move together simultaneously with and to the same extent as slides or rods $y'$ mounted in slideways or apertures in the sides of the casing A and connected by a handle $x'$ by which both elements of the cleaning means are connected and carried in such manner that their relation is maintained as they are coincidently moved in the same direction, whereby they are maintained in parallelism and in juxtaposition to the filter medium throughout their movement.

As shown each wall N and N' is fixed to the sides of the casing A and extended upwardly and downwardly therein at an angle of about 45°, with its under side opposed to the current flow therethrough. As shown each deflector Q and Q' is similarly inclined with its open upper side adjacent the under side of the wall N or N', and is extended therefrom at said angle through and below the path of current flow, and is trough shaped so that its hollow side may afford a quiescent zone across said current and its inclined bottom may afford a downward gravity slideway for particles precipitated from the wall.

As shown each distorter P and P' is a cylindrical roller mounted above and in contact with the upper or egress side of the wall N or N' opposite the deflector beneath it and constructed to downwardly distort the wall toward or into the hollow side of the adjacent deflector and to simultaneously resist current flow through the interstices of the wall where it is distorted by the distorter.

As shown each wall N and N' is stationary and the cleaning means is movable longitudinally of it and is constructed to successively clean adjacent portions of it as the cleaning means is moved in any suitable manner, as for example, by the handle $x'$ by which both its elements are carried or to which both are connected in such manner that their relation is maintained as they are coincidently moved in the same direction and to the same extent at the same time, and they are guided by being carried by slides or rods $y'$ mounted in slideways or apertures in the sides of the casing A, whereby they are maintained in parallelism throughout their movement.

Preferably as shown in Fig. 1 the deflector Q has a vertical gravity chute R' conducting through and to below the current zone particles precipitated into and sliding down the deflector Q, and the deflector Q' has a downwardly inclined slideway S for conducting through and across and to below the current zone particles precipitated in and sliding down the deflector Q', and the deflectors Q and Q' are maintained in coincidence and relation by being rigidly fixed to each other and to their rod $y'$, and the distorters P and P' are maintained in coincidence and relation by being rigidly fixed to each other and fixed to their rod $y'$, in such manner that each distorter may be maintained in juxtaposition to its deflector throughout their movement longitudinally to the filter medium by the rods $y'$ which are extended above and below the latter without intersecting it.

Making the filter medium in two parts reversely inclined has the advantage that each resists the tendency of the other to flex with variations in current stress and when the two parts are arranged in inverted V-shape cross section and the distorters are similarly arranged the stress of each roll is transmitted through the distorters to that of the other.

In operation with the preferred utilization of my invention shown, a fluid current to be filtered will upflow through the oppositely inclined walls N and N' and particles floating in the current will be deposited on the under sides of the latter, from which their precipitation will be facilitated by movement of the cleaning means longitudinally of the walls in such manner that the deflectors Q and Q' will cause a relatively quiescent zone adjacent said under sides at the same time as each distorter P and P' distorts the cloth toward the deflectors and into such zone, which will permit such particles to fall from the under side of the walls into the trough shaped deflectors and slide down the latter through and across the zone of the current. As the cleaning means is moved successive portions of the under side of the walls will be cleaned, and such movement will be effected manually in the construction shown and should be effected whenever the walls become sufficiently clogged with impurities to materially resist upflow of current through them.

It will be understood that my invention is not limited to the particular details of construction, arrangement or combination of features, set forth as constituting its preferred form since it can be availed of in whole or in part according to such modifications thereof as circumstances, or the judgment of those skilled in the art, may dictate, without departing from the spirit of the invention.

What I claim is:

In filtering apparatus comprising a casing defining a fluid flow passage, a pair of oppositely inclined interstitial filtering walls within said casing extending horizontally across said passage, cleaning means comprising a pair of oppositely inclined deflector means below and in proximity with the under sides of said inclined walls, of similar inclination and extending substantially parallel with the latter throughout the slant height thereof and constructed and arranged to intercept the upflow of fluid toward the under sides of said walls to afford a quiescent zone between said deflectors and portions of the undersides of said walls in which separation and precipitation from said under sides of particles deposited thereon is facilitated, distorting means resting on the filtering walls opposite said deflecting means, said walls and said cleaning means being one movable relatively to the other, and means for moving the movable one of said parts, whereby dislodgement of said particles is successively facilitated from each portion of the undersides of said walls through the relatively quiescent zone defined by said deflectors.

GEORGE HOLT FRASER.